(12) United States Patent
Saleem

(10) Patent No.: US 11,078,859 B2
(45) Date of Patent: Aug. 3, 2021

(54) OXYGEN SENSOR OUT OF SPECIFICATION HEATER RATIONALITY MONITOR USING COLD START CYCLE

(71) Applicant: Atheel A Saleem, Farmington Hills, MI (US)

(72) Inventor: Atheel A Saleem, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 139 days.

(21) Appl. No.: 16/599,694

(22) Filed: Oct. 11, 2019

(65) Prior Publication Data
US 2021/0108587 A1 Apr. 15, 2021

(51) Int. Cl.
*F02D 41/14* (2006.01)

(52) U.S. Cl.
CPC ..... *F02D 41/1495* (2013.01); *F02D 41/1494* (2013.01); *F02D 41/1496* (2013.01); *F02D 41/1454* (2013.01)

(58) Field of Classification Search
CPC ............. F02D 41/1494; F02D 41/1495; F02D 41/1496
USPC ................................ 73/114.73; 123/690, 697
See application file for complete search history.

(56) References Cited

U.S. PATENT DOCUMENTS

| 4,958,611 | A | * | 9/1990 | Uchinami | ........... | F02D 41/1494 |
| | | | | | | 123/690 |
| 5,090,387 | A | * | 2/1992 | Mayer | ................. | F02D 41/1494 |
| | | | | | | 123/479 |
| 5,218,946 | A | | 6/1993 | Wild et al. | | |
| 5,228,426 | A | | 7/1993 | Pursifull et al. | | |
| 5,245,979 | A | | 9/1993 | Pursifull et al. | | |
| 5,454,259 | A | * | 10/1995 | Ishii | ..................... | F02D 41/1443 |
| | | | | | | 73/114.72 |
| 5,669,219 | A | * | 9/1997 | Schnaibel | ........... | F02D 41/1494 |
| | | | | | | 123/697 |
| 5,781,878 | A | | 7/1998 | Mizoguchi et al. | | |
| 5,929,328 | A | * | 7/1999 | Seidenfuss | .......... | F02D 41/1495 |
| | | | | | | 73/114.73 |
| 8,751,185 | B2 | * | 6/2014 | Magarida | ............ | F02D 41/1494 |
| | | | | | | 702/130 |
| 2010/0269805 | A1 | * | 10/2010 | Fukuda | ................. | F02D 41/222 |
| | | | | | | 123/690 |
| 2014/0278013 | A1 | * | 9/2014 | Gibson | ............... | F02D 41/1494 |
| | | | | | | 701/108 |

* cited by examiner

*Primary Examiner* — Erick R Solis
(74) *Attorney, Agent, or Firm* — Ralph E. Smith

(57) ABSTRACT

Vehicle oxygen sensor heater diagnostic techniques comprise, upon detection of a set of cold start conditions of the vehicle, measuring an initial resistance of each of a set of two or more oxygen sensor heaters and determining whether any of the measured initial resistances is outside of a nominal resistance range. In response to an outlier oxygen sensor heater being outside of the nominal resistance range, each of the set oxygen sensor heaters is provided with an equal voltage for a period, the resistance of each of the set of oxygen sensor heaters is monitored during the period, and a malfunction of the outlier oxygen sensor heater is detected or matured when a difference between its resistance and the resistances of the other oxygen sensor heaters after the period is greater than a calibrated threshold.

16 Claims, 3 Drawing Sheets

OXYGEN SENSOR OUT OF SPECIFICATION HEATER RATIONALITY MONITOR USING COLD START CYCLE

FIELD

The present application generally relates to vehicle oxygen sensor heaters and, more particularly, to diagnostic techniques for vehicle oxygen sensor heaters using the vehicle's cold start cycle.

BACKGROUND

Internal combustion engines combust a mixture of air and fuel to drive pistons and generate drive torque. Exhaust gas resulting from combustion is treated by an exhaust system before being released into the atmosphere. These exhaust systems typically include oxygen sensors that measure the oxygen concentration of the exhaust gas, which can be used to adjust combustion parameters, such as an air/fuel ratio. Oxygen sensors do not function well at low temperatures. While the exhaust gas produced by the engine will eventually heat the oxygen sensors to a desired temperature range for proper functionality, this could take too long and result in potentially excessive emissions.

Thus, oxygen sensors are often packaged with heaters that are configured to quickly heat the sensors to the desired temperature range. These heaters, however, could degrade or malfunction over time, which could also result in inaccurate exhaust gas oxygen concentration measurement and possibly increased emissions. Conventional oxygen sensor heater diagnostic systems are incapable of differentiating between a malfunction of the heater itself and a malfunction in the control circuit for the heater. Accordingly, while conventional oxygen sensor heaters do work well for their intended purpose, there remains a need for improvement in their diagnostic systems.

SUMMARY

According to one example aspect of the invention, an oxygen sensor heater diagnostic system for a vehicle is presented. In one exemplary implementation, the system comprises: a set of oxygen sensor heaters comprising at least two oxygen sensor heaters that are each associated with a respective oxygen sensor in an exhaust system of the vehicle, and a controller configured to, upon detection of a set of cold start conditions of the vehicle: measure an initial resistance of each of the set of oxygen sensor heaters, and determine whether any of the measured initial resistances is outside of a nominal resistance range, and in response to one of the measured initial resistances corresponding to an outlier oxygen sensor heater being outside of the nominal resistance range: provide each of the set oxygen sensor heaters with an equal voltage for a period, during the period, monitor the resistance of each of the set of oxygen sensor heaters, and detect a malfunction of the outlier oxygen sensor heater when a difference between its resistance and the resistances of the other oxygen sensor heaters after the period is greater than a calibrated threshold.

In some implementations, the oxygen sensors associated with the set of oxygen sensor heaters are each a switching-type or binary-type oxygen sensor. In some implementations, the controller is configured to determine the nominal resistance range based on an ambient temperature and using a resistance-temperature relationship provided by a supplier of the set of oxygen sensor heaters.

In some implementations, when at least two of the measured resistances are outside of the nominal resistance range, the controller is configured to not detect malfunctions of any of the set of oxygen sensor heaters. In some implementations, the measuring and monitoring of the resistances of the set of oxygen sensor heaters is performed by the controller using respective analog-to-digital (A/D) converters.

In some implementations, the engine comprises a single set of cylinders arranged in an in-line configuration, the exhaust system is a single exhaust system comprising a single catalytic converter, and the set of oxygen sensor heaters comprises an upstream oxygen sensor heater disposed upstream from the catalytic converter and a downstream oxygen sensor heater disposed downstream from the catalytic converter.

In other implementations, the engine comprises first and second sets of cylinders arranged in first and second cylinder banks in a V-configuration, the exhaust system is a dual exhaust system comprising first and second catalytic converters, and the set of oxygen sensor heaters comprises a first and second upstream oxygen sensor heaters disposed upstream from the first and second catalytic converters, respectively, and first and second downstream oxygen sensor heaters disposed downstream from the first and second catalytic converters, respectively. In some implementations, the controller is configured to compare the measured resistances of the first and second upstream oxygen sensor heaters and to compare the measured resistances of the first and second downstream oxygen sensor heaters.

According to another example aspect of the invention, an oxygen sensor heater diagnostic method for a vehicle is presented. In one exemplary implementation, the method comprises: upon detection of a set of cold start conditions of the vehicle: measuring, by a controller of the vehicle, an initial resistance of each of a set of oxygen sensor heaters comprising at least two oxygen sensor heaters that are each associated with a respective oxygen sensor in an exhaust system of the vehicle and determining, by the controller, whether any of the measured initial resistances is outside of a nominal resistance range, and, in response to one of the measured initial resistances corresponding to an outlier oxygen sensor heater being outside of the nominal resistance range: providing, by the controller, each of the set oxygen sensor heaters with an equal voltage for a period, during the period, monitoring, by the controller, the resistance of each of the set of oxygen sensor heaters, and detecting, by the controller, a malfunction of the outlier oxygen sensor heater when a difference between its resistance and the resistances of the other oxygen sensor heaters after the period is greater than a calibrated threshold.

In some implementations, the oxygen sensors associated with the set of oxygen sensor heaters are each a switching-type or binary-type oxygen sensor. In some implementations, the method further comprises determining, by the controller, the nominal resistance range based on an ambient temperature and using a resistance-temperature relationship provided by a supplier of the set of oxygen sensor heaters.

In some implementations, the method further comprises when at least two of the measured resistances are outside of the nominal resistance range, not detecting, by the controller, malfunctions of any of the set of oxygen sensor heaters. In some implementations, the measuring and monitoring of the resistances of the set of oxygen sensor heaters by the controller is performed using respective A/D converters.

In some implementations, the engine comprises a single set of cylinders arranged in an in-line configuration, the exhaust system is a single exhaust system comprising a single catalytic converter, and the set of oxygen sensor heaters comprises an upstream oxygen sensor heater disposed upstream from the catalytic converter and a downstream oxygen sensor heater disposed downstream from the catalytic converter.

In other implementations, the engine comprises first and second sets of cylinders arranged in first and second cylinder banks in a V-configuration, the exhaust system is a dual exhaust system comprising first and second catalytic converters, and the set of oxygen sensor heaters comprises a first and second upstream oxygen sensor heaters disposed upstream from the first and second catalytic converters, respectively, and first and second downstream oxygen sensor heaters disposed downstream from the first and second catalytic converters, respectively. In some implementations, the method further comprises comparing, by the controller, the measured resistances of the first and second upstream oxygen sensor heaters and comparing, by the controller, the measured resistances of the first and second downstream oxygen sensor heaters.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, there remains a need for improved diagnostic techniques for oxygen sensor heaters because conventional diagnostic techniques are incapable of distinguishing between a malfunction of the oxygen sensor heater itself due to heater rationality (e.g., over-aging) or a malfunction of its control circuit (e.g., a software malfunction). The inability to reliably detect such malfunctions could result in increased emissions and/or engine imbalance (e.g., different fueling to different cylinder banks). Accordingly, improved oxygen sensor heater diagnostic systems and methods are presented. These diagnostic techniques leverage the accurate resistance measurement of oxygen sensor heaters prior to a cold start of the engine. That is, after the engine has experienced a substantial soak period (e.g., 8 or more hours), the engine coolant temperature should be equal to or approximately equal to the ambient temperature. Thus, there are no external thermal factors that will affect the resistance measurement of the oxygen sensor heaters. After initial resistance measurements are taken, they are compared to a nominal resistance range to determine if there are any outliers. This nominal resistance range depends on the ambient temperature and could be determined from a resistance-ambient temperature relationship provided by the supplier of the oxygen sensor heaters.

When one outlier is detected, a second phase of the diagnostic techniques begins. When there are no outliers or multiple outliers, however, the diagnostic techniques end. For example, when there are two or more outliers, a rationality between the various oxygen sensor heaters is not reliable because it is unknown which oxygen sensor heaters are properly functioning. When the one outlier is detected, the second phase begins. In response to the one sensor heater resistance being outside of the nominal resistance range, every oxygen sensor heater is immediately provided with equal voltage for a period (e.g., ~3 seconds). The resistances of the oxygen sensors are then measured during this period, as they will change in response to this voltage. This period upon cold starting is important because the resistances of the oxygen sensor heaters will all eventually merge over time as the exhaust gas temperature increases. Differences between the outlier oxygen sensor heater resistance and one or more of the other resistances are monitored during this period. If the difference(s) exceed a calibrated threshold after the period, a malfunction of the outlier oxygen sensor heater is matured (e.g., a diagnostic trouble code, or DTC is set).

Figure 1:
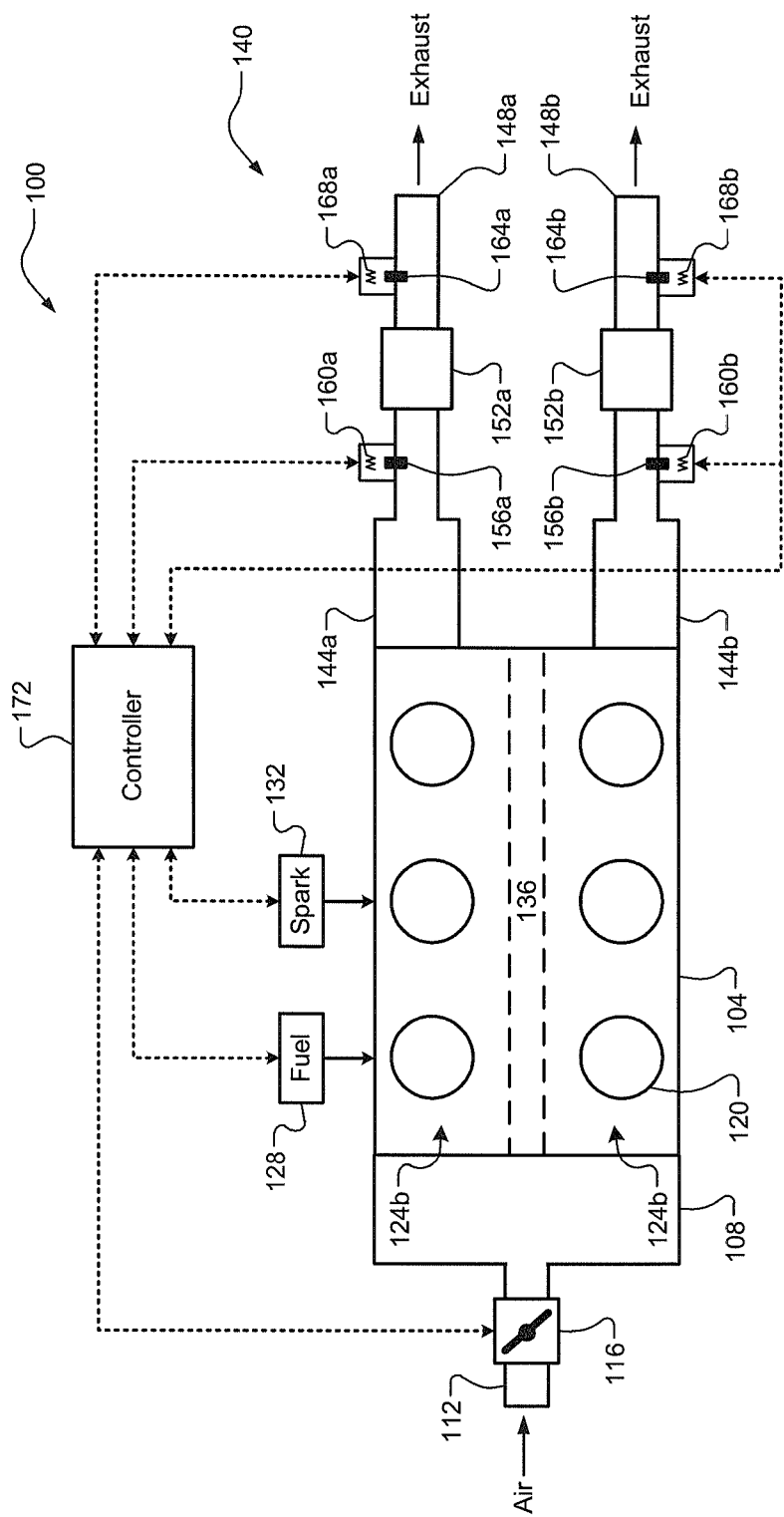
FIG. 1 is a diagram of a vehicle having an oxygen sensor heater diagnostic system according to the principles of the present disclosure.

Referring now to FIG. 1, a diagram of a vehicle 100 having an example oxygen sensor diagnostic system is illustrated. The vehicle 100 comprises an engine 104 that draws air into an intake manifold 108 via an induction system 112 that is regulated by a throttle valve 116. The air in the intake manifold 112 is distributed to a plurality of cylinders 120. In the illustrated exemplary implementation, the cylinders 120 are arranged in two cylinder banks 124a, 124b in a V-configuration. While six cylinders are shown, it will be appreciated that the engine 104 could have any suitable number of cylinders. It will be appreciated, however, that the diagnostic techniques of the present disclosure are applicable to any engine having at least two oxygen sensor heaters, such as an in-line engine having a single exhaust system. The air in the cylinders 120 is combined with fuel (e.g., gasoline) from a fuel system 124 and the air/fuel mixture is compressed by pistons (not shown) within the cylinders 120. The compressed air/fuel mixture is then combusted (e.g., by spark from a spark system 128), which drives the pistons (not shown) to rotate/turn a crankshaft 132 and generate drive torque that is then transferred to a driveline (not shown) via a transmission (not shown).

The exhaust gas resulting from combustion is expelled from the cylinders 120 into an exhaust system 140. As shown, the exhaust system 140 is a dual exhaust system having two separate exhaust paths for the two cylinder banks 124a, 124b. As previously mentioned, however, it will be appreciated that the diagnostic techniques of the present disclosure could be applicable to a single exhaust system having at least two oxygen sensor heaters. The exhaust gas from the cylinders 120 is expelled into exhaust manifolds 144a, 144b and then through exhaust passages 148a, 148b. Catalysts (e.g., catalytic converters) 152a, 152b are disposed along the respective exhaust passages 148a, 148b and are configured to treat the exhaust gas to mitigate or eliminate emissions. Upstream oxygen sensors 156a, 156b are disposed upstream of the respective catalysts 152a, 152b and are associated with respective upstream oxygen sensor heaters 160a, 160b. Similarly, downstream oxygen sensors 164a, 164b are disposed downstream of the respective catalysts 152a, 152b and are associated with respective downstream oxygen sensor heaters 168a, 168b. In one exemplary implementation, the oxygen sensors 156a, 156b, 164a, 164b are all switching-type or binary-type oxygen sensors, but it will be appreciated that they could be other types of oxygen sensors (e.g., wide-range oxygen, or WRO2 sensors).

The oxygen sensor heater diagnostic system generally comprises at least two of the oxygen sensor heaters 160a, 160b, 168a, 168b and a controller 172 of the vehicle 100. In one exemplary implementation, the oxygen sensor heaters 160a, 160b, 168a, 168b are inexpensive resistive heating elements (e.g., resistors), but it will be appreciated that other configurations could be utilized. As shown, the oxygen sensor heaters 160a, 160b, 168a, 168b are arranged very close to the respective oxygen sensors 156a, 156b, 164a, 168b (e.g., in packaged units) for optimal heating performance. The controller 172 receives temperature measurements from temperature sensors 176, including, but not limited to, ambient temperature and engine coolant temperature. While the controller 172 is discussed herein as performing the oxygen sensor heater diagnostic techniques, it will be appreciated that the controller 172 also controls operation of the engine 104, including controlling air/fuel/spark. For example, the controller 172 could be configured to vary an air/fuel ratio of the engine 104 based on exhaust gas oxygen concentration measurements by the oxygen sensors 156a, 156b, 164a, 164b. For purposes of this disclosure, however, the oxygen sensor heater diagnostic techniques performed by the controller 172 will be focused on.

Figure 2:
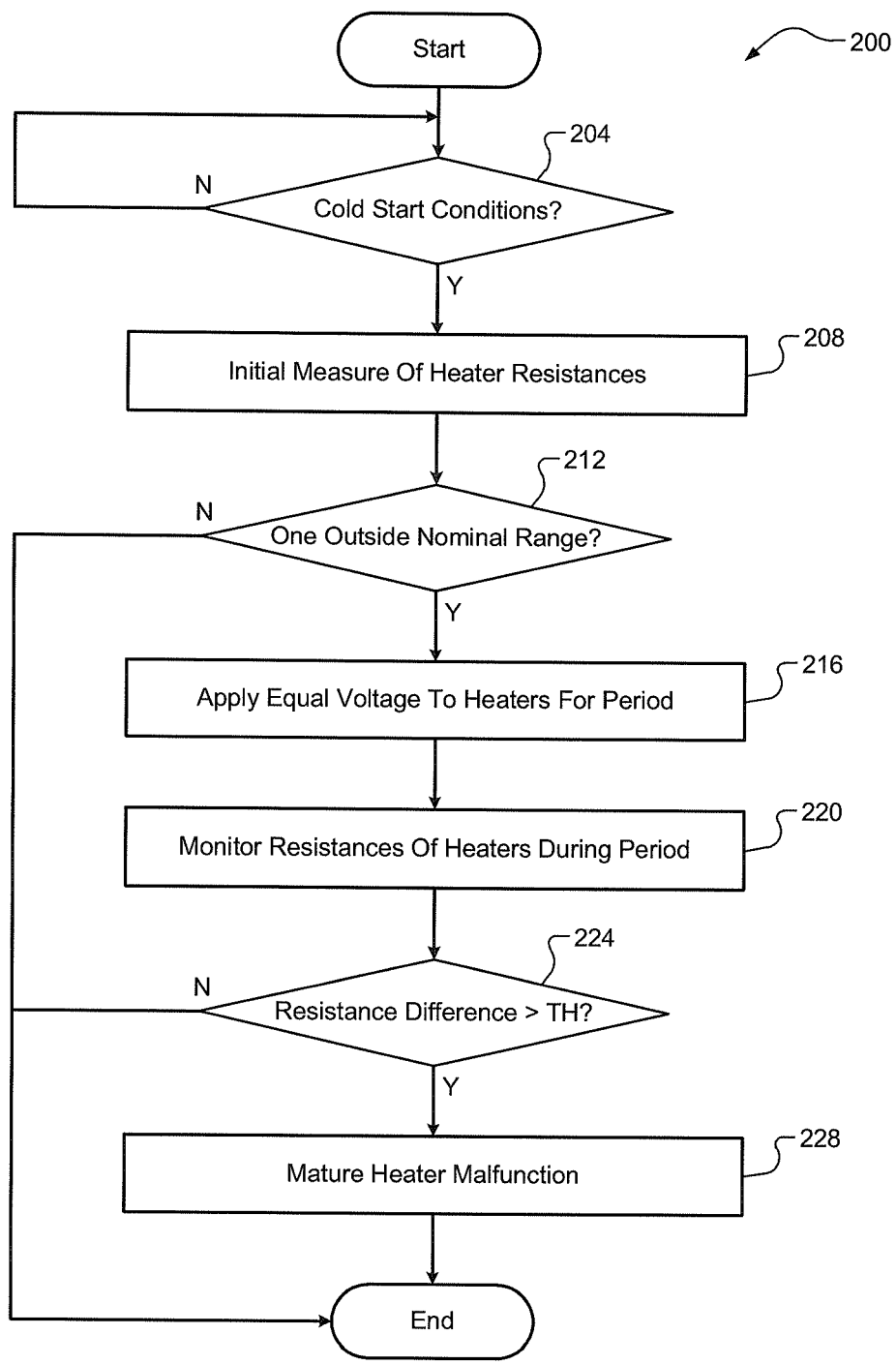
FIG. 2 is a flow diagram of an example oxygen sensor heater diagnostic method according to the principles of the present disclosure.
Figure 3:
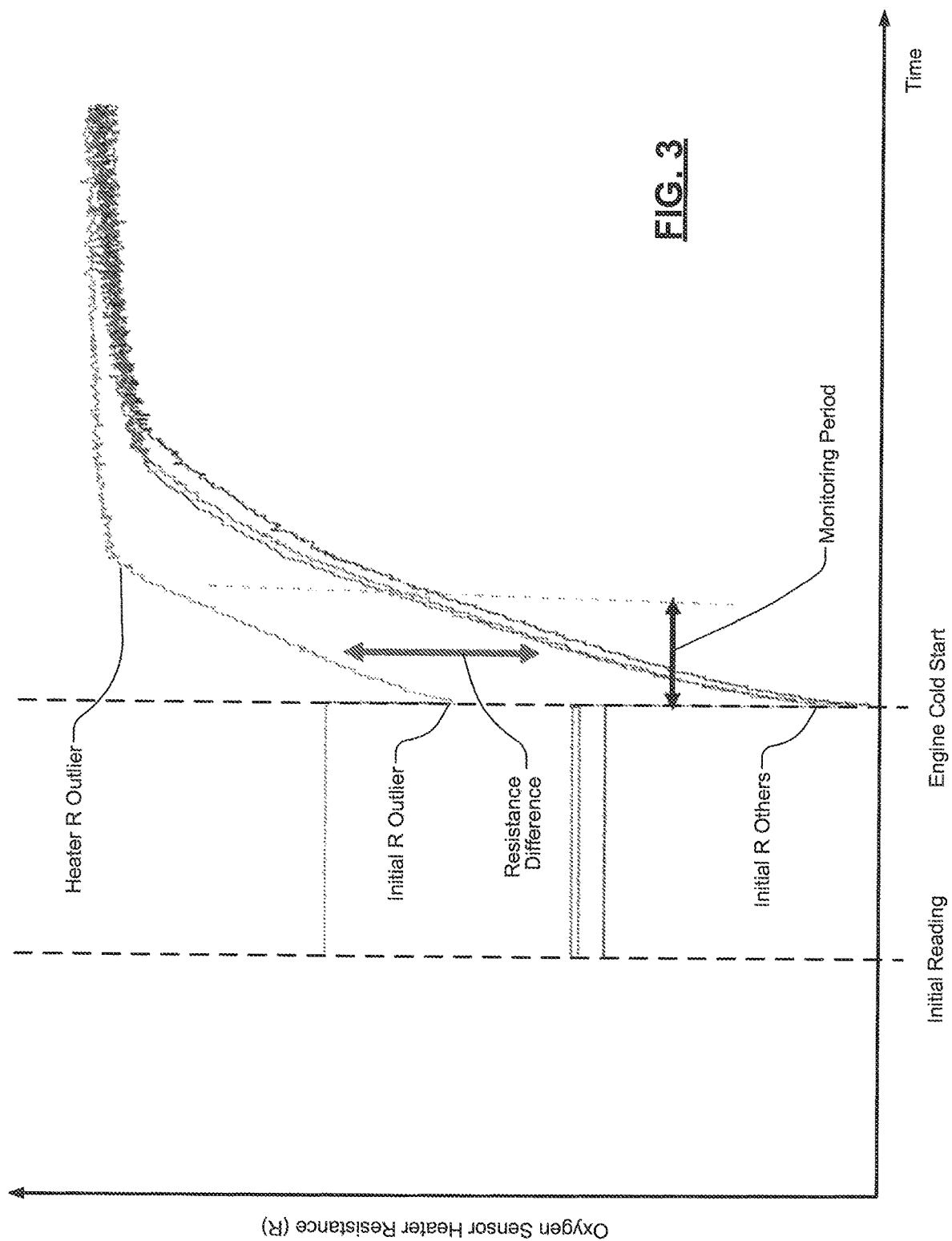
FIG. 3 is a plot illustrating an example oxygen sensor heater malfunction according to the principles of the present disclosure.

Referring now to FIG. 2 and with additional reference to FIG. 3, a flow diagram of an example oxygen sensor heater diagnostic method 200 (e.g., performed by controller 172) is illustrated. At 204, the controller 172 determines whether a set of cold start condition(s) of the vehicle 100 are satisfied. These condition(s) could include, for example only, the engine coolant temperature being equal to or approximately equal to the ambient temperature. In other words, these conditions are intended to determine whether the engine 104 has been off for an appropriate soak period such that no external thermal factors could affect the oxygen sensor heater resistance measurements, thus providing for a very accurate and stable reading. When the condition(s) are satisfied, the method 200 proceeds to 208. Otherwise, the method 200 ends or returns to 204 until the condition(s) are satisfied. At 208, the controller 172 measures the initial resistances of the oxygen sensor heaters 160a, 160b, 168a, 168b. This could include, for example only, the controller 172 obtaining a quick digital sample of the voltage and current of the oxygen sensor heaters 160a, 160b, 168a, 168b via internal or external analog-to-digital (A-D) converters (not shown) to then calculate the initial heater resistance values.

At 212, the controller 172 determines whether one of the initial measured resistances is outside of a nominal resistance range (hereinafter, the "outlier oxygen sensor heater," illustrated by the upper-most line in FIG. 3). This nominal resistance range could be determined by the controller 172, for example, using a resistance-ambient temperature relationship (e.g., a table) provided by the supplier of the oxygen sensor heaters 160a, 160b, 168a, 168b. This relationship could be used to determine an appropriate resistance range for the current ambient temperature. It should be noted that the controller 172 is only determining whether there is one of the initial measured resistances outside of the nominal resistance range. When none or two or more of the measured resistances is outside of the nominal resistance range, no malfunction will be detected (e.g., the method 200 will end) because there is either nothing indicative of a malfunction (none outside of the nominal resistance range) or a ratio- nality between the measured resistances will be unreliable (more than two outside of the nominal resistance range). When only one of the measured resistances is outside of the nominal resistance range, however, the method 200 will proceed to 216 where a second phase begins.

At 216, the controller 172 provides equal voltage to each of the oxygen sensor heaters 160a, 160b, 168a, 168b for a period (e.g., ~3 seconds). At 220, the controller 172 monitors the resistances of the oxygen sensor heaters 160a, 160b, 168a, 168b during the period. At 224, the controller 172 determines whether the difference between the resistance of the outlier oxygen sensor heater and one or more of the remaining oxygen sensor heaters at the end of the period is greater than a calibrated threshold. In one exemplary implementation, the controller 172 only compares the resistances of the upstream oxygen sensor heaters 160a, 160b to each other and only compares the resistances of the downstream oxygen sensor heaters 168a, 168b to each other because these pairs of devices should be expected to experience similar conditions. When the resistance difference is less than the calibrated threshold, the method 200 ends. When the resistance difference exceeds the calibrated threshold, however, the method 200 proceeds to 232 where the controller 172 matures a malfunction of the outlier oxygen sensor heater (e.g., set a DTC) and the method 200 ends.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture. As previously discussed herein, it will also be appreciated that the controller(s) described herein could include additional non-illustrated circuitry, such as, but not limited to, A-D converters for reading or measuring analog signals (e.g., resistances).

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An oxygen sensor heater diagnostic system for a vehicle, the system comprising:
   a set of oxygen sensor heaters comprising at least two oxygen sensor heaters that are each associated with a respective oxygen sensor in an exhaust system of the vehicle; and
   a controller configured to:
      upon detection of a set of cold start conditions of the vehicle:
         measure an initial resistance of each of the set of oxygen sensor heaters, and
         determine whether any of the measured initial resistances is outside of a nominal resistance range; and
      in response to one of the measured initial resistances corresponding to an outlier oxygen sensor heater being outside of the nominal resistance range:

provide each of the set oxygen sensor heaters with an equal voltage for a period, during the period, monitor the resistance of each of the set of oxygen sensor heaters, and detect a malfunction of the outlier oxygen sensor heater when a difference between its resistance and the resistances of the other oxygen sensor heaters after the period is greater than a calibrated threshold.

2. The system of claim 1, wherein the oxygen sensors associated with the set of oxygen sensor heaters are each a switching-type or binary-type oxygen sensor.

3. The system of claim 1, wherein the controller is configured to determine the nominal resistance range based on an ambient temperature and using a resistance-temperature relationship provided by a supplier of the set of oxygen sensor heaters.

4. The system of claim 1, wherein when at least two of the measured resistances are outside of the nominal resistance range, the controller is configured to not detect malfunctions of any of the set of oxygen sensor heaters.

5. The system of claim 1, wherein the measuring and monitoring of the resistances of the set of oxygen sensor heaters is performed by the controller using respective analog-to-digital (A/D) converters.

6. The system of claim 1, wherein:
the engine comprises a single set of cylinders arranged in an in-line configuration;
the exhaust system is a single exhaust system comprising a single catalytic converter; and
the set of oxygen sensor heaters comprises an upstream oxygen sensor heater disposed upstream from the catalytic converter and a downstream oxygen sensor heater disposed downstream from the catalytic converter.

7. The system of claim 1, wherein:
the engine comprises first and second sets of cylinders arranged in first and second cylinder banks in a V-configuration;
the exhaust system is a dual exhaust system comprising first and second catalytic converters; and
the set of oxygen sensor heaters comprises a first and second upstream oxygen sensor heaters disposed upstream from the first and second catalytic converters, respectively, and first and second downstream oxygen sensor heaters disposed downstream from the first and second catalytic converters, respectively.

8. The system of claim 7, wherein the controller is configured to compare the measured resistances of the first and second upstream oxygen sensor heaters and to compare the measured resistances of the first and second downstream oxygen sensor heaters.

9. An oxygen sensor heater diagnostic method for a vehicle, the method comprising:
upon detection of a set of cold start conditions of the vehicle:
measuring, by a controller of the vehicle, an initial resistance of each of a set of oxygen sensor heaters comprising at least two oxygen sensor heaters that are each associated with a respective oxygen sensor in an exhaust system of the vehicle; and determining, by the controller, whether any of the measured initial resistances is outside of a nominal resistance range; and in response to one of the measured initial resistances corresponding to an outlier oxygen sensor heater being outside of the nominal resistance range:

providing, by the controller, each of the set oxygen sensor heaters with an equal voltage for a period;

during the period, monitoring, by the controller, the resistance of each of the set of oxygen sensor heaters; and detecting, by the controller, a malfunction of the outlier oxygen sensor heater when a difference between its resistance and the resistances of the other oxygen sensor heaters after the period is greater than a calibrated threshold.

10. The method of claim 9, wherein the oxygen sensors associated with the set of oxygen sensor heaters are each a switching-type or binary-type oxygen sensor.

11. The method of claim 9, further comprising determining, by the controller, the nominal resistance range based on an ambient temperature and using a resistance-temperature relationship provided by a supplier of the set of oxygen sensor heaters.

12. The method of claim 9, further comprising when at least two of the measured resistances are outside of the nominal resistance range, not detecting, by the controller, malfunctions of any of the set of oxygen sensor heaters.

13. The method of claim 9, wherein the measuring and monitoring of the resistances of the set of oxygen sensor heaters by the controller is performed using respective analog-to-digital (A/D) converters.

14. The method of claim 9, wherein:
the engine comprises a single set of cylinders arranged in an in-line configuration;
the exhaust system is a single exhaust system comprising a single catalytic converter; and
the set of oxygen sensor heaters comprises an upstream oxygen sensor heater disposed upstream from the catalytic converter and a downstream oxygen sensor heater disposed downstream from the catalytic converter.

15. The method of claim 9, wherein:
the engine comprises first and second sets of cylinders arranged in first and second cylinder banks in a V-configuration;
the exhaust system is a dual exhaust system comprising first and second catalytic converters; and
the set of oxygen sensor heaters comprises a first and second upstream oxygen sensor heaters disposed upstream from the first and second catalytic converters, respectively, and first and second downstream oxygen sensor heaters disposed downstream from the first and second catalytic converters, respectively.

16. The method of claim 15, further comprising comparing, by the controller, the measured resistances of the first and second upstream oxygen sensor heaters and comparing, by the controller, the measured resistances of the first and second downstream oxygen sensor heaters.

* * * * *